United States Patent [19]

Gerstner et al.

[11] Patent Number: 5,662,453

[45] Date of Patent: Sep. 2, 1997

[54] TRUCK BED LIFT SYSTEM AND METHOD

[76] Inventors: Steven R. Gerstner; Donald D. Roberts, both of 715 Orange St., Auburndale, Fla. 33823

[21] Appl. No.: 412,192

[22] Filed: Mar. 28, 1995

[51] Int. Cl.[6] ........................................... B60P 1/04
[52] U.S. Cl. .................... 414/786; 414/471; 414/477; 414/495; 293/118
[58] Field of Search ................... 293/118; 298/156, 298/11, 12, 17.5, 17.6, 17.7, 17.8, 14; 414/471, 477, 539, 478, 480, 786, 495, 498, 534, 499, 532, 533, 500, 469

[56] References Cited

U.S. PATENT DOCUMENTS

| | | |
|---|---|---|
| 2,504,467 | 4/1950 | Thetford ........................ 414/469 |
| 2,621,814 | 12/1952 | Lisota ........................... 414/477 |
| 3,485,400 | 12/1969 | Pewthers ....................... 414/477 |
| 4,348,054 | 9/1982 | Shonkwiler et al. ............ 414/471 X |
| 4,410,207 | 10/1983 | Scharf . | 
| 4,516,902 | 5/1985 | Matson . |
| 4,702,662 | 10/1987 | Marlett ......................... 414/477 |
| 4,795,303 | 1/1989 | Bubik . |
| 4,929,142 | 5/1990 | Nespor . |
| 4,988,258 | 1/1991 | Lutz et al. . |
| 5,000,645 | 3/1991 | Polojarvi ....................... 414/498 X |
| 5,022,703 | 6/1991 | Westbrook . |
| 5,249,909 | 10/1993 | Roberts et al. . |
| 5,328,320 | 7/1994 | Farrow et al. ................. 414/537 X |
| 5,360,311 | 11/1994 | Lutz et al. .................... 293/118 X |

FOREIGN PATENT DOCUMENTS 2251198 5/1974 Germany ................. 414/469

*Primary Examiner*—Frank E. Werner
*Attorney, Agent, or Firm*—Allen, Dyer, Doppelt, Milbrath & Gilchrist, P.A.

[57] ABSTRACT

A truck bed lift system is provided that includes elements for positioning a truck bed at a predetermined height and angle. The system has means for sliding the truck bed relative to the truck frame, means for lifting the truck bed, and means for tilting the truck bed about a pivot point. In addition, elements are provided for retracting a bumper guard so that it does not impede a downward tilting movement of the truck bed. Methods are also provided for transferring an object between a loading platform and the truck bed when the truck frame and the loading platform are noncoplanar.

6 Claims, 5 Drawing Sheets

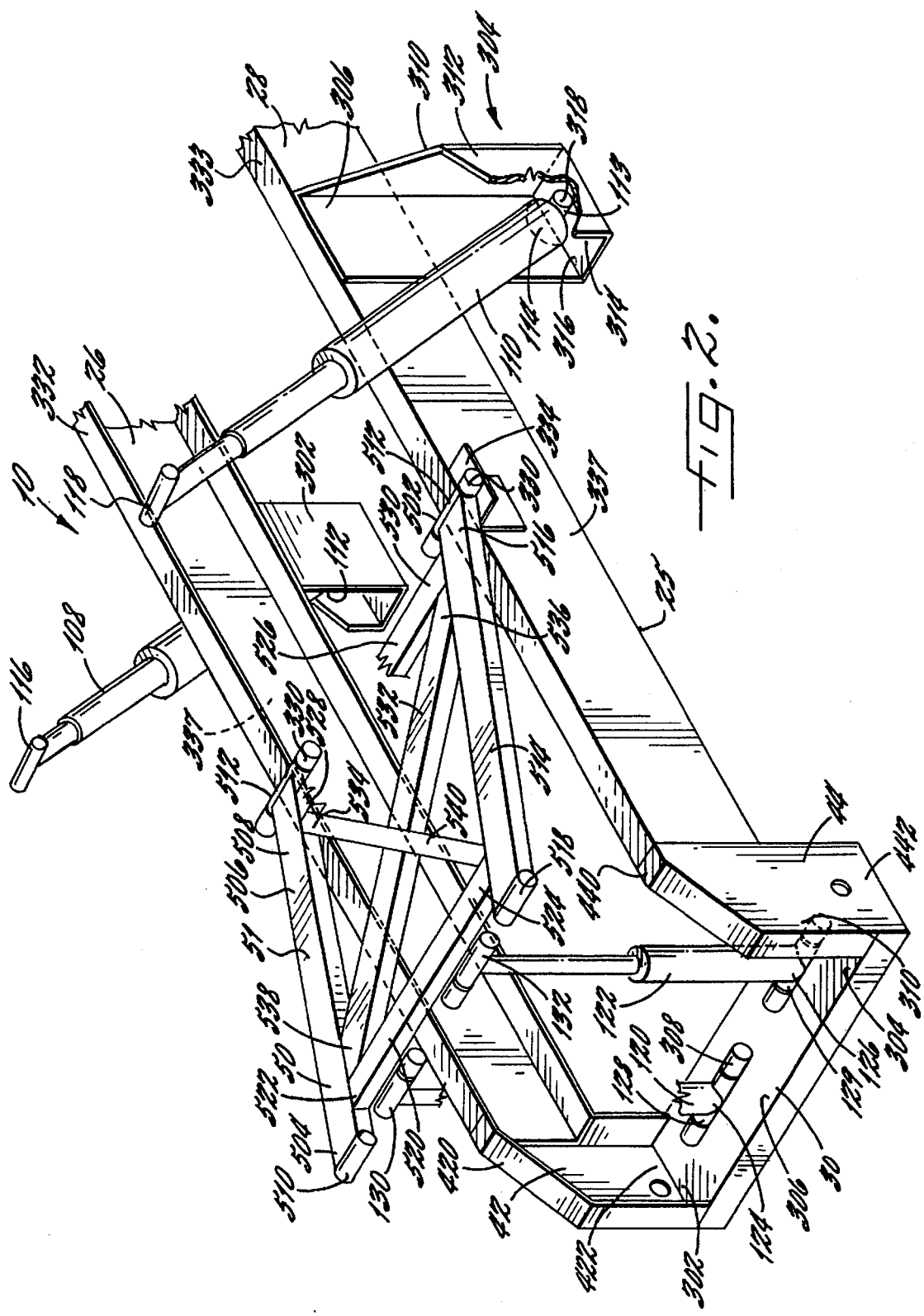

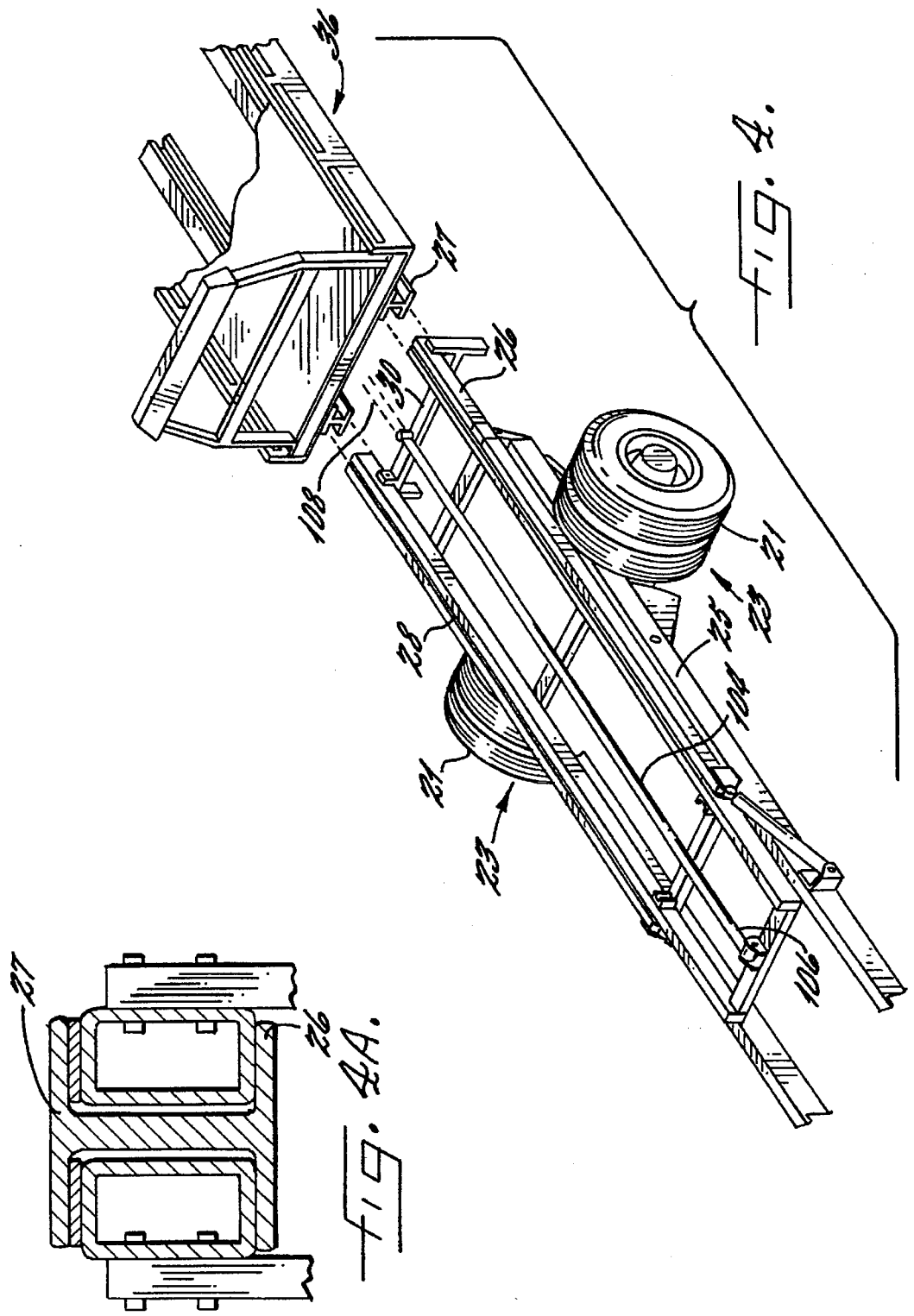

TRUCK BED LIFT SYSTEM AND METHOD

BACKGROUND OF THE INVENTION

1. Field of the Invention

The present invention relates to truck bed loading and unloading systems, and, more particularly, to adjustable truck bed lift systems for loading, transporting, and unloading vehicles and other objects.

2. Description of Related Art

Various systems for transporting loads with trucks have been known in the art. Specifically, load carriers have been described that are tiltable in order to receive and/or discharge a load from the ground or from platforms of various heights. A vehicle transporting apparatus is disclosed by Bubik (U.S. Pat. No. 4,795,303) that includes a platform pivotally mounted to the chassis of a truck. A powered actuator moves the platform to either a forwardly inclined or a rearwardly inclined position.

Nespor (U.S. Pat. No. 4,929,142) has described a vehicle carrier the comprises a tilting bed for mounting on the chassis of a towing vehicle. The tilting bed is supported by a pair of elongated beams and brace structures positioned beneath the bed.

Roberts et al. (U.S. Pat. No. 5,249,909) have disclosed a towing truck having an elevated deck that is hydraulically operated. In use, the deck slides along a pair of oppositely spaced rails that are pivotally secured to the framework of the truck.

Rear bumpers are mandated by the U.S. Department of Transportation to be at most 32 inches above the ground. As these structures can impede loading and unloading processes in vehicles having pivotable beds, it is desirable to be able to move the bumper out of the way of the bed. One such system, disclosed by Scharf (U.S. Pat. No. 4,410,207), describes a bumper structure having arm members pivotally attached to the tiltable load carrier. The bumper structure is automatically adjusted from an extended condition to a retracted condition as the tilting load carrier angularly moves from a horizontal position to its maximum angular position.

Another system, described by Matson (U.S. Pat. No. 4,516,902), teaches a bumper apparatus connected to a tiltable trailer, wherein the bumper is automatically positioned between a depending position and a raised position. In addition, Westbrook (U.S. Pat. No. 5,022,703) discloses a retractable rear bumper that is attached to shafts that are telescoped into tubes in order to move them against the bottom of the truck bed. Lutz et al. (U.S. Pat. No. 4,988,258) also describe a bumper apparatus that is pivotally mounted to an elevated chassis, wherein the bumper can be raised by a piston-style actuator.

SUMMARY OF THE INVENTION

It is thus an object of the present invention to provide a truck bed lift system that can be adjusted to the height of ground or of a loading dock.

It is a further object to provide a truck bed lift system that is pivotable relative to the horizontal plane.

It is an additional object to provide a truck bed lift system that has a rotatable bumper guard that can be moved out of the way of the lift bed when the lift bed is in the lowered position.

It is yet a further object to provide a method for transferring an object between a loading platform and a truck having a bed, wherein the truck bed and the platform are noncoplanar.

The truck bed lift system of the present invention comprises elements for positioning a bed of a truck at a predetermined height and angle. The truck bed is supported in spaced relation above the truck frame. One element comprises means for sliding the truck bed relative to the truck frame. The sliding means are in movement-producing contact with the truck bed and are affixed to the truck frame. In a preferred embodiment, the sliding means comprises a telescoping slide hydraulic member pivotally affixed at a first end to the truck frame and pivotally affixed at a second end to the truck bed. Extension of the slide hydraulic member produces a rearward movement of the truck bed relative to the truck frame, and contraction of the slide hydraulic member produces a forward movement of the truck bed relative to the truck frame.

A second element comprises means for lifting the truck bed to the predetermined height. The lifting means are positioned beneath the truck bed and are affixed to the truck frame. In a preferred embodiment, the means for lifting comprises a rear lift member and a forward lift member disposed along the truck frame, the rear lift member being disposed rearward of the forward lift member relative to the truck frame.

A third element comprises means for tilting the truck bed about a pivot point to the predetermined angle. The pivot point is located rearward of the rearmost pair of wheels of the truck. The means for tilting comprises means for activating the rear and the forward lift members differentially, thereby permitting relative lifting movement therebetween. Such relative movement is capable of effecting forward and rearward tilting relative to the truck frame.

In a preferred embodiment, the truck bed lift system further comprises means for hoisting a load to be carried onto the truck bed. The hoisting means are affixed to the truck bed.

In an additional embodiment, means are provided for retracting a bumper guard affixed at the rear end of the truck frame. The retracting means has its first end pivotally affixed to the truck bed. The retracting means retracts the bumper guard from a first position depending downward from the truck frame to a second position wherein the bumper guard forms an acute angle with the truck frame and the second end is forward of the first end. This movement to the second position prevents the bumper guard from impeding a downward tilting movement of the truck bed.

The method of the present invention permits transferring an object between a loading platform and a truck having a bed, for the situation in which the truck frame and the platform are noncoplanar. The method comprises the steps of sliding the truck bed rearward until the rear end of the truck bed is in vertical alignment with the loading platform. Next the forward end of the truck bed is elevated with forward lifting means to the height of the loading platform, and the rear end of the truck bed is elevated with rear lifting means to the height of the loading platform. The truck bed is then slid further rearward until it overlaps the loading platform, and the object to be loaded is transferred between the loading platform and the truck. If the truck is provided with a bumper guard, a further step is provided for retracting the bumper guard so that it does not impede the downward tilting movement of the truck bed.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 2 is a perspective view of the elements of the lift system beneath the bed.

FIG. 4 is a top perspective view, partially broken away, of the truck bed and telescoping slide hydraulic member.

FIG. 4A is a cross-sectional view of a portion of the truck bed shown in FIG. 4.

DETAILED DESCRIPTION OF THE PREFERRED EMBODIMENTS

A description of the preferred embodiments of the present invention will now be presented with reference to FIGS. 1–4.

Figure 1:
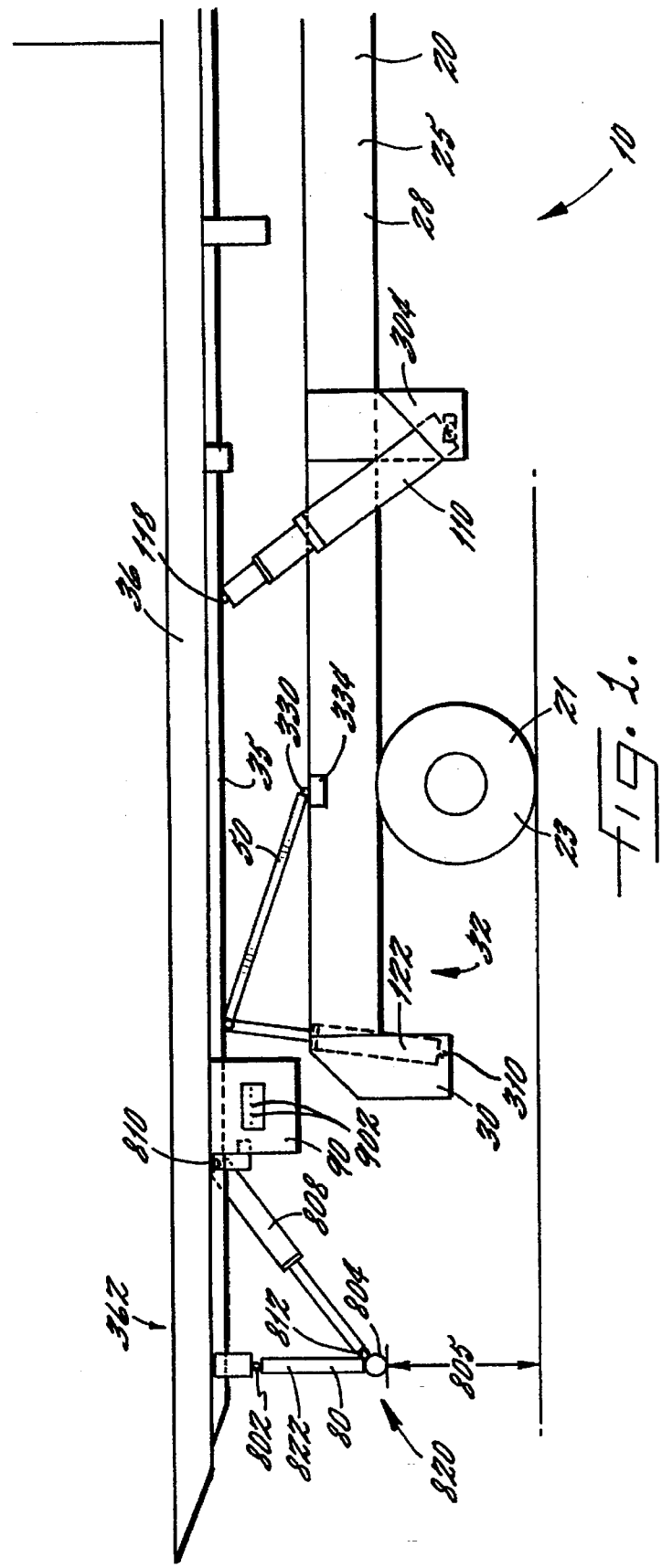
FIG. 1 illustrates a side view of the truck bed lift system in the position for carrying a load.

FIGS. 1 and 2 illustrate a side and a perspective view of the truck bed lift system 10 of the present invention, which is affixed to and supported by a truck 20. Truck 20 has a frame 25, supported by the wheels 21, among which is a pair of rearmost wheels 23. The frame in turn has a left 26 and a right 28 frame rail. Each side rail 26 and 28 has a pivot pin holder 330 on the top surface 332, 333, respectively, supported by an "L"-shaped brace member 334 affixed to the outer surfaces 336, 337 of the rails 26, 28. Each side rail 26 and 28 further has depending therefrom and affixed thereto, forward of the pivot pin holders 330, a forward lift member frame support 302 and 304, respectively. Right support 304 will be described in detail, with left support 302 being generally a mirror image thereof.

Right support 304 comprises an inner wall 306 bolted to and generally coplanar with the outer face 337 of right rail 28. Forward wall 310 meets inner wall 306 at generally a right angle, and outer wall 312 likewise meets forward wall 310 at a generally right angle. Meeting all three walls 306, 310, and 312 at generally right angles is bottom wall 314, these four walls forming a generally rectangular box having an open top and one open rearward-facing side. On the upper surface 316 of bottom wall 314 is pivot pin holder 318. The truck 20 further has a pair of rearmost wheels 23 supporting the frame 25. Truck bed 36 is supported in spaced relation above the frame 25.

Truck frame 25 further comprises a rear frame rail 30 spanning the left 26 and right 28 frame rails at the rear end 32 of the truck 20. Specifically, rear frame rail 30 is affixed beneath left 26 and right 28 frame rails by left 42 and right 44 rear frame connectors, which are affixed at their top ends 420 and 440 to left 26 and right 28 frame rails, respectively, and at their bottom ends 422 and 442 to the left 302 and right 304 ends of the rear frame rail 30. Rear frame rail 30 further has a top surface 306, which has affixed thereto a pair of pivot pin holders 308 and 310.

Truck bed lift system 10, as shown in top perspective view in FIG. 4 and in cross section in FIG. 4A, comprises a means for sliding the truck bed 36 relative to the frame 25. In the preferred embodiment the sliding means comprises a telescoping slide hydraulic member 104 pivotally affixed at a first end 106 to the truck frame 25. The second end 108 of the slide hydraulic member 104 is pivotally affixed to the truck bed 36 rearward of the first end 106. Extension of the slide hydraulic member 104 thus produces a rearward movement of the truck bed 36 relative to the truck frame 25, left 26 and right 28 frame rails slidably matable with I beams 27 affixed beneath truck bed 36. Contraction of the slide hydraulic member 104, in a similar fashion, thus produces a forward movement of the truck bed 36 relative to the truck frame 25.

Truck bed lift system 10, as shown in FIG. 2, further comprises a means for lifting the truck bed 36 to a predetermined height and a means for tilting the truck bed 36 about a pivot point rearward of the pair of rearmost wheels 23 to a predetermined angle. In the embodiment shown in FIGS. 1 and 2, the lifting and tilting means comprise a forward and a rear lift member disposed along and affixed to the truck frame 25, the rear lift member disposed rearward of the forward lift member relative to the truck frame 25. In the preferred embodiment, the forward lift member comprises a left 108 and a right 110 telescoping forward hydraulic lift member pivotally affixed at their first ends 112 and 114, respectively, to the bottom walls of the forward lift member frame supports 302 and 304. Specifically, pivot pins 113 affixed at the first ends 112 and 114 are inserted into pivot pin holders 318 in order to provide pivotability. The absence of a top wall and a rear wall in supports 302 and 304 may be seen to permit the lift members 108 and 110 to pivot rearward unimpeded.

The second ends 116 and 118 of the left 108 and right 110 forward lift members each comprise a generally cylindrical member positioned in supporting relation to the bottom 35 of truck bed 36. The cylindrical axes are positioned generally horizontal and normal to the left 26 and right 28 frame rails. The cylindrical shape permits smooth rolling against the bottom 35 of truck bed 36 when the first ends 112 and 114 pivot relative to the forward lift member frame supports 302 and 304 during a sliding motion of the truck bed 36 relative to the frame 25.

The rear lift member comprises a left 120 and a right 122 telescoping rear hydraulic lift member pivotally affixed, respectively, by their first ends 124 and 126, to the rear truck frame rail 30. The first ends 124 and 126 comprise pivot pins 128, 129, which are inserted into pivot pin holders 308 and 310 to provide a pivoting connection. The second ends 130 and 132 of the left 120 and the right 122 rear lift members comprise a generally cylindrical member. The cylindrical axes are positioned generally vertical and normal to the left 26 and right 28 frame rails.

The lifting means of the present invention in the preferred embodiment further comprises a lift support member 50. Lift support member 50 has a first end 502 and a second end 504 and is pivotally affixed to the truck frame 25 at the first end 502. Further, lift support member 50 is positioned beneath and in supporting relation to the truck bed 36 at the second end 504. The lift support member 50 is liftable generally at the second end 504 by the rear lift members 120, 122.

In further detail, with reference to FIG. 2, the lift support member 50 comprises a support frame 51 that in turn comprises a left brace member 506 having a forward end 508 and a rear end 510, the forward end 508 having a pivot pin 512 pivotally affixed to the pivot pin holder 330 of the left truck frame rail 26. Likewise, the support frame 51 comprises a right brace member 514 having a forward end 516 and a rear end 518, the forward end 516 having a pivot pin 512 pivotally affixed to the pivot pin holder 330 of the right truck frame rail 28. The rear ends 510 and 518 each comprise a generally cylindrical member, which permits smooth movement against the bottom 35 of truck bed 36.

In addition, a rear cross brace member 520 is affixed at its left end 522 adjacent the rear end 510 of the left brace member 506 and at its right end 524 adjacent the rear end 518 of the right brace member 514. The rear cross brace member 520 is liftable by the left 120 and the right 122 rear hydraulic lift members.

Support frame 51 further comprises a forward cross brace member 526 affixed at its left end 528 to the forward end 508 of the left brace member 506 and at its right end 530 to the forward end 516 of the right brace member 514. The forward cross brace member 526 provides support to the left 506 and the right 514 brace member.

In addition, support frame 51 comprises an X-shaped brace member 532 having four ends: a left forward end 534 affixed adjacent the left end 528 of the forward cross brace member 526 and adjacent the forward end 508 of the left brace member 506, a right forward end 536 affixed adjacent the right end 530 of the forward cross brace member 526 and adjacent the forward end 506 of the right brace member 514, a left rear end 538 affixed adjacent the left end 522 of the rear cross brace member 520 and adjacent the rear end 510 of the left brace member 506, and a right rear end 540 affixed adjacent the right end 524 of the rear cross brace member 520 and adjacent the rear end 518 of the right brace member 514. The X-shaped brace member 532 provides support to the left 506 and the right brace member 514 and to the forward 526 and the rear 520 cross brace member.

The means for tilting of the preferred embodiment of the present invention comprises means for activating the rear 120, 122 and the forward 108, 110 hydraulic lift members differentially. This differential activation thereby permits relative lifting movement between the forward and rear, which thus effects forward and rearward tilting relative to the truck frame 25.

It can thus be seen that the tilting and lifting means may be activated differentially to enable an operator to align the truck bed 36 with a surface, such as a loading dock 60 or the ground 65 from/to which loading/unloading may occur irrespective of the angle of the truck 20 to the surface.

As discussed above, bumper guards are mandated to be positioned at the rear of trucks that have no stinger attached. In the truck 20 of the present invention, bumper guard 80 comprises a rod member 820 pivotally affixed via a connecting member 822 at its first end 802 to the rear end 362 of the truck bed 36 (see FIG. 1). In a first position, the second end 804 of the bumper guard 80 is depending downward from the truck bed 36 and is a predetermined distance 805 from the ground, in the preferred embodiment 32 inches. The present invention provides a means of retracting the bumper guard 80 from the first position to a second position wherein the bumper guard 80 forms an acute angle 806 with the truck bed 36 and the second end 804 is forward of the first end 802, thereby preventing the bumper guard 80 from impeding a downward tilting movement of the truck bed 36 (see FIG. 3). In a further embodiment, the tilting means and the bumper guard retracting means are coupled so as to activate the bumper guard retracting means during a downward tilting movement.

Specifically, in the preferred embodiment, the bumper guard retracting means comprises a telescoping bumper guard hydraulic member 808 having a first end 810 pivotally affixed to the truck bed 36 and a second end 812 movably affixed to the second end 804 of the bumper guard 80. In this case, retracting of the bumper guard 80 is effected by causing the telescoping bumper guard hydraulic member 808 to contract, thereby pulling the second end 804 of the bumper guard 80 forward and upward (see FIG. 3).

Means for activating the sliding, lifting, and tilting the truck bed 36 and for retracting the bumper guard 80 in the preferred embodiment comprise means for activating the extension and contraction of the telescoping hydraulic members 104, 108, 110, 120, 122, and 808. This activation is effected via a set of switches 902 on control panel 90, affixed to truck bed 36 and in signal communication with the hydraulic members.

Figure 3A:
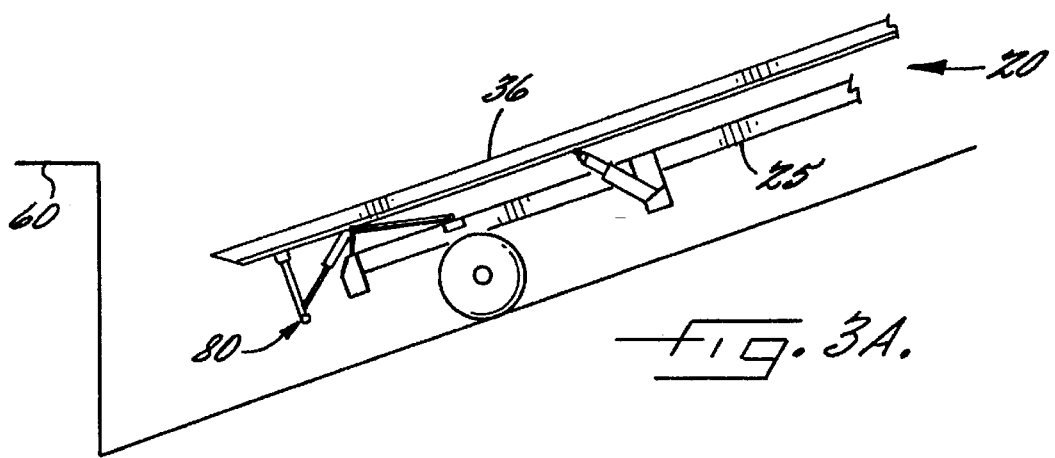
FIG. 3(a)–(f) shows a truck having the bed lifted into a configuration for loading/unloading an object from/to a loading dock when the truck is on a descending ramp.
Figure 3B:
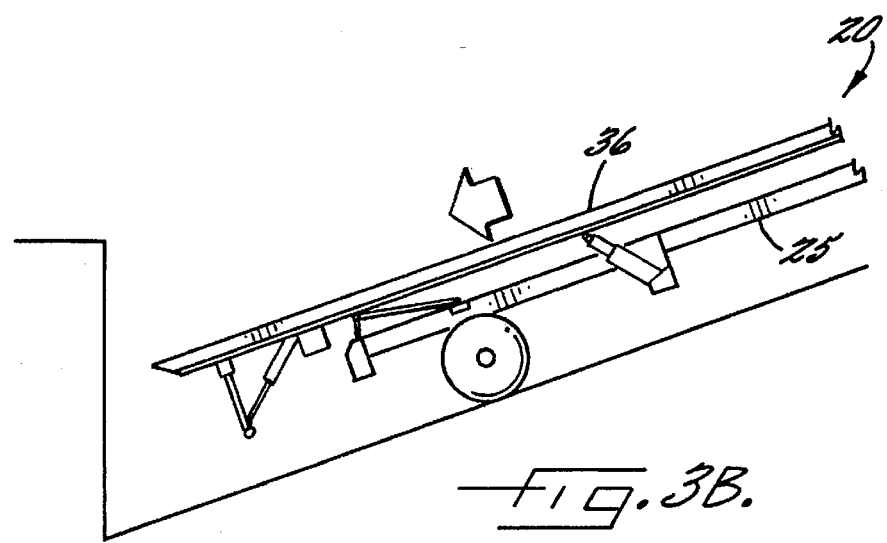
Figure 3C:
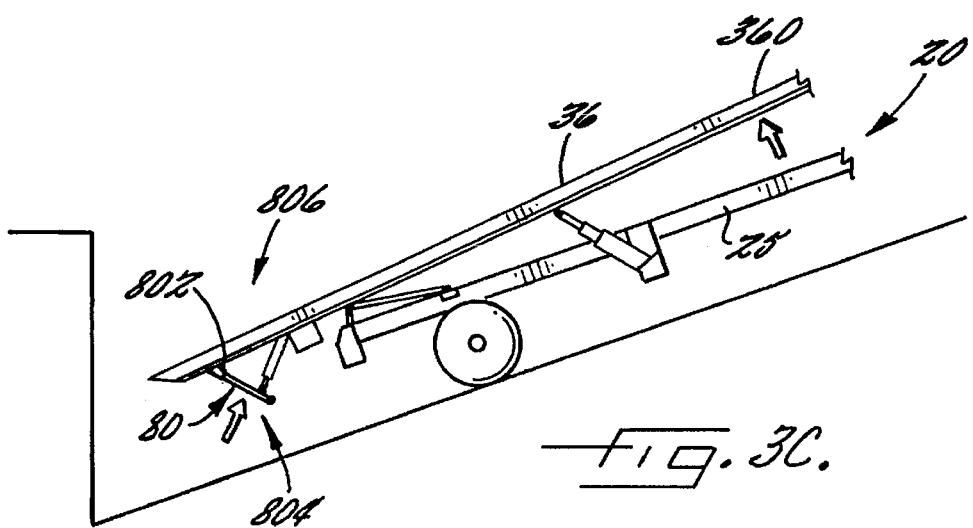
Figure 3D:
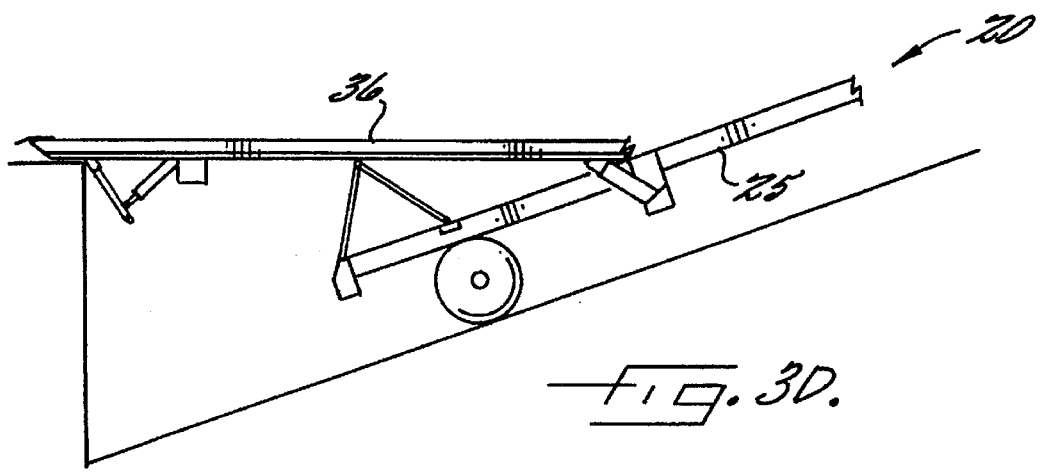
Figure 3E:
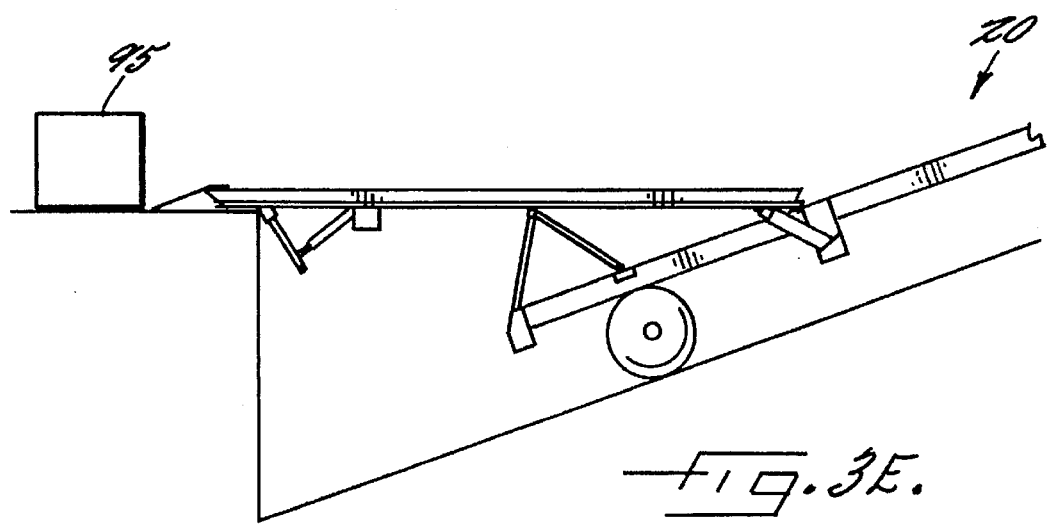
Figure 3F:
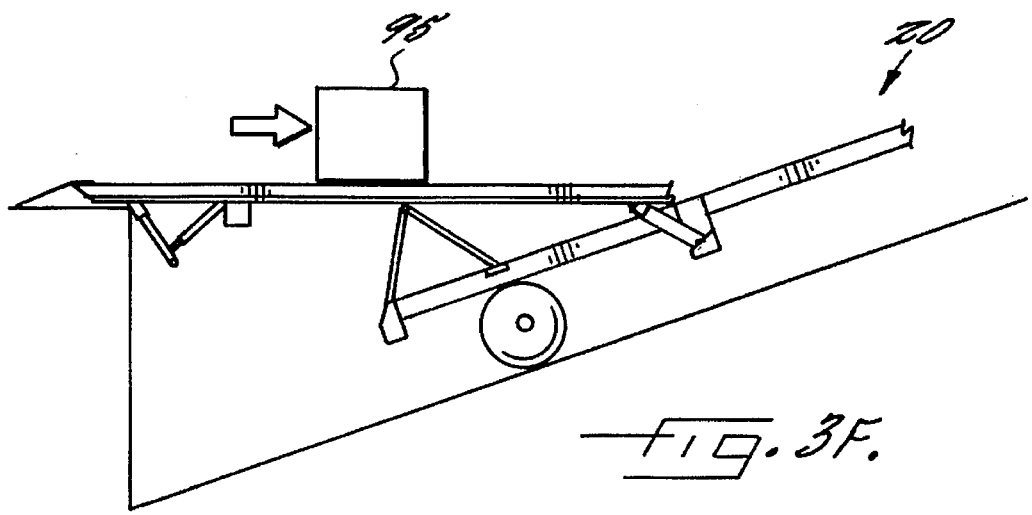

The present invention further comprises a method for transferring an object between a loading platform 60 and the truck 20 as described above, wherein the truck frame 25 and the platform 60 are noncoplanar (see FIG. 3a). This method comprises the steps of sliding the truck bed 36 rearward until a rear end of the truck bed 36 is in vertical alignment with the loading platform 60 [FIG. 3(b)]. Next the forward end 360 of the truck bed 36 is lifted with forward lifting means to the height of the loading platform 60 [FIG. 3(c)]. Then the rear end 362 of the truck bed 36 is elevated with rear lifting means to the height of the loading platform 60 [FIG. 3(d)], and the truck bed 36 is slid further rearward until it overlaps the loading platform 60 [FIG. 3(e)]. Finally, the object 95 to be loaded is transferred between the loading platform 60 and the truck bed 36 [FIG. 3(f)].

An additional method is provided for transferring an object 95 between a loading platform 60 and the truck 20 of the present invention having a bed 36 and a bumper guard 80, wherein the truck frame 25 and the platform 60 are noncoplanar [FIG. 3(a)]. The method comprises the steps of sliding the truck bed 36 rearward until it is in vertical alignment with the loading platform 60 [FIG. 3(b)]. Next the forward end 360 of the truck bed 36 is elevated with forward lifting means to the height of the loading platform 60 [FIG. 3(c)]. Then the rear end 362 of the truck bed 36 with rear lifting means to the height of the loading platform 60 [FIG. 3(d)]. The bumper guard 80 is retracted upward sufficiently far that the bumper guard 80 does not impede a downward tilting movement of the truck bed 36 [FIG. 3(c)]. Then the truck bed 36 is slid further rearward until it overlaps the loading platform 60 [FIG. 3(e)], and the object 95 is transferred between the loading platform 60 and the truck bed 36 [FIG. 3(f)].

It may be appreciated by one skilled in the art that additional embodiments may be contemplated.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A method for transferring an object between a loading platform and a truck having a bed, the truck bed supported in spaced relation above a frame of the truck, wherein the truck frame and the platform are noncoplanar, the method comprising the steps of:

sliding the truck bed rearward until a rear end of the truck bed is in vertical alignment with the loading platform;

elevating a forward end of the truck bed with forward lifting means to the height of the loading platform;

elevating a rear end of the truck bed relative to the truck frame with rear lifting means to the height of the loading platform, wherein the rear lifting means comprises:

a left and a right rear hydraulic lift member affixed, respectively, to a left and a right truck frame rail; and a lift support member, comprising a support frame comprising:

a left brace member having a forward end and a rear end, the forward end pivotally affixed to the left truck frame rail;

a right brace member having a forward end and a rear end, the forward end pivotally affixed to the right truck frame rail; and a rear cross brace member affixed at a left end adjacent the rear end of the left brace member and at a right end adjacent the rear end of the right brace member, the rear cross brace member liftable by the left and the right rear hydraulic lift members;

sliding the truck bed further rearward until it overlaps the loading platform; and transferring the object between the loading platform and the truck.

2. A method for transferring an object between a loading platform and a truck having a bed and a bumper guard, the truck bed supported in spaced relation above a frame of the truck, wherein the truck frame and the platform are noncoplanar, the method comprising the steps of:

sliding the truck bed rearward until it is in vertical alignment with the loading platform;

elevating a forward end of the truck bed with forward lifting means to the height of the loading platform;

elevating a rear end of the truck bed relative to the truck frame with rear lifting means to the height of the loading platform, wherein the rear lifting means comprises:

a left and a right rear hydraulic lift member affixed, respectively, to a left and a right truck frame rail; and a lift support member, comprising a support frame comprising:

a left brace member having a forward end and a rear end, the forward end pivotally affixed to the left truck frame rail;

a right brace member having a forward end and a rear end, the forward end pivotally affixed to the right truck frame rail; and a rear cross brace member affixed at a left end adjacent the rear end of the left brace member and at a right end adjacent the rear end of the right brace member, the rear cross brace member liftable by the left and the right rear hydraulic lift members;

retracting the bumper guard upward sufficiently far that the bumper guard does not impede a downward tilting movement of the truck bed;

sliding the truck bed further rearward until it overlaps the loading platform; and transferring the object between the loading platform and the truck.

3. A method for positioning a bed of a truck at a predetermined height and angle, the truck bed supported in spaced relation above a frame of the truck, the method comprising the steps of:

sliding the bed of the truck relative to the truck frame;

lifting the truck bed relative to the truck frame to the predetermined height, the lifting achieved with forward and rear lifting means, the rear lifting means comprising:

a left and a right rear hydraulic lift member affixed, respectively, to a left and a right truck frame rail; and a lift support member, comprising a support frame comprising:

a left brace member having a forward end and a rear end, the forward end pivotally affixed to the left truck frame rail;

a right brace member having a forward end and a rear end, the forward end pivotally affixed to the right truck frame rail; and a rear cross brace member affixed at a left end adjacent the rear end of the left brace member and at a right end adjacent the rear end of the right brace member, the rear cross brace member liftable by the left and the right rear hydraulic lift members; and tilting the truck bed about a pivot point to the predetermined angle, the pivot point located rearward of a pair of rearmost wheels of the truck.

4. A method for positioning a bed of a truck at a predetermined height and angle, the truck bed supported in spaced relation above a frame of the truck, the method comprising the steps of:

sliding the bed of the truck relative to the truck frame;

lifting the truck bed to the predetermined height with the use of a rear lift member and a forward lift member disposed along the truck frame, the rear lift member disposed rearward of the forward lift member relative to the truck frame, and further with the use of a lift support member having a first end and a second end, the lift support member pivotally affixed to the truck frame at the first end and beneath and in supporting relation to the truck bed at the second end, the lift support member liftable generally at the second end by the rear lift member, wherein:

the forward lift member comprises a left and a right forward hydraulic lift member affixed to a left and a right rail, respectively, of the truck frame;

the rear lift member comprises a left and a right rear hydraulic lift member affixed, respectively, to the left and the right truck frame rail; and the lift support member comprises a support frame comprising:

a left brace member having a forward end and a rear end, the forward end pivotally affixed to the left truck frame rail;

a right brace member having a forward end and a rear end, the forward end pivotally affixed to the right truck frame rail; and a rear cross brace member affixed at a left end adjacent the rear end of the left brace member and at a right end adjacent the rear end of the right brace member, the rear cross brace member liftable by the left and the right rear hydraulic lift members; and tilting the truck bed about a pivot point to the predetermined angle, the pivot point located rearward of a pair of rearmost wheels of the truck, by activating the rear and the forward lift members differentially, thereby permitting relative lifting movement therebetween to effect forward and rearward tilting relative to the truck frame.

5. The truck bed positioning method recited in claim 4, wherein the lifting step further comprises lifting with the use of the support frame, the support frame further comprising:

a forward cross brace member affixed at a left end to the forward end of the left brace member and at a right end to the forward end of the right brace member, the forward cross brace member providing support to the left and the right brace members; and an X-shaped brace member having four ends, a left forward end affixed to the left end of the forward cross brace member and to the forward end of the left brace member, a right forward end affixed to the right end of the forward cross brace member and to the forward end of the right brace member, a left rear end affixed to the left end of the rear cross brace member and to the rear end of the left brace member, and a right rear end affixed to the right end of the rear cross brace member and to the rear end of the right brace member, the X-shaped brace member providing support to the left and the right brace members and to the forward and the rear cross brace members.

6. A method for positioning a bed of a truck at a predetermined height and angle, the truck bed supported in spaced relation above a frame of the truck, and for retracting a bumper guard affixed at a rear end of the truck bed, the method comprising the steps of:

sliding a bed of a truck relative to the truck frame;

lifting the truck bed to the predetermined height with the use of lifting means positioned beneath the truck bed and affixed to the truck frame, wherein the lifting means comprises:

a forward lift member disposed along the truck frame and affixed to the truck bed;

a rear lift member disposed rearward of the forward lift member relative to the truck frame, the rear lift member comprising:

a left and a right rear hydraulic lift member affixed, respectively, to a left and a right truck frame rail; and a lift support member comprising a support frame comprising:

a left brace member having a forward end and a rear end, the forward end pivotally affixed to the left truck frame rail;

a right brace member having a forward end and a rear end, the forward end pivotally affixed to the right truck frame rail; and a rear cross brace member affixed at a left end adjacent the rear end of the left brace member and at a right end adjacent the rear end of the right brace member, the rear cross brace member liftable by the left and the right rear hydraulic lift members;

tilting the truck bed about a pivot point to the predetermined angle, the pivot point located rearward of a pair of rearmost wheels of the truck; and retracting a bumper guard having a first end and a second end, the first end pivotally affixed to the truck bed, wherein the retracting comprises retracting the bumper guard from a first position depending downward from the truck bed to a second position wherein the bumper guard forms an acute angle with the truck bed and the second end is forward of the first end, thereby preventing the bumper guard from impeding a downward tilting movement of the truck bed.

* * * * *